Patented Oct. 31, 1933

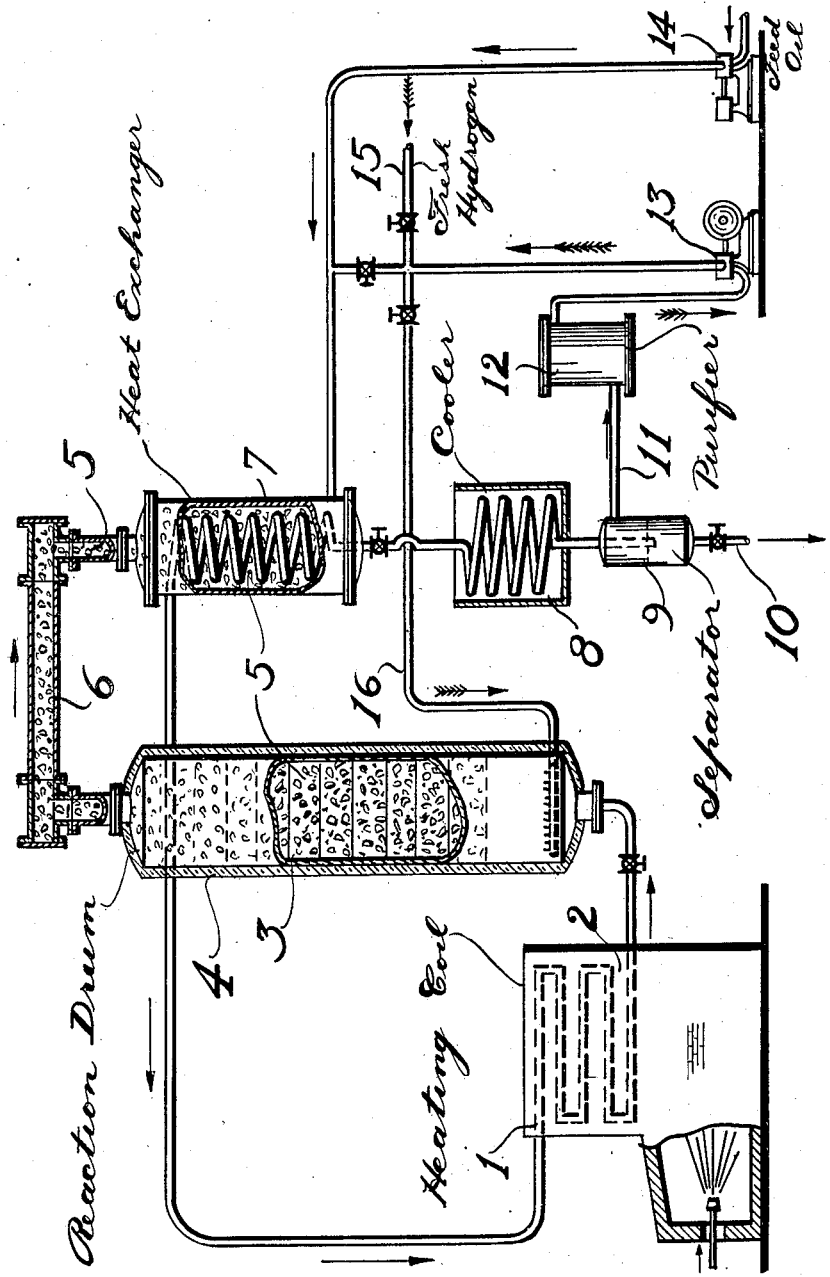

1,933,503

UNITED STATES PATENT OFFICE 1,933,503

PROCESS FOR HYDROGENATION OF CARBONACEOUS MATERIALS

James M. Jennings, Baton Rouge, La., assignor, by mesne assignments, to Standard-I. G. Company, Linden, N. J., a corporation of Delaware Application November 20, 1929
Serial No. 408,475

5 Claims. (Cl. 196—53)

The present invention relates to the art of producing valuable products from petroleum, coal oils, shale oils and the like and more specifically comprises an improved method for refining such materials by the action of high pressure hydrogen at an elevated temperature and in the presence of catalytic materials. The improvements in the process will be fully understood from the following description and the drawing which illustrates one form of apparatus applicable for my process.

The drawing is a semi-diagrammatic view in sectional elevation of an apparatus constructed according to my invention and indicates the flow of materials.

Referring to the drawing, reference numeral 1 indicates a heating coil arranged in a suitable furnace setting 2 and adapted to heat a stream of oil to temperature in excess of 750° F. The coil discharges into a reaction drum 3 which is protected from excessive loss of heat by an insulating cover 4. The drum is capable of withstanding pressures in excess of 200 atmospheres while at a temperature of 750 to 870° F. or higher as well as the corrosive effects of hydrogen and hydrogen sulphide.

The drum is filled with a suitable catalytic material 5, the nature of which will be disclosed below and which is packed in coarse lumps. Pipe 6 conducts the reaction products from the drum to a heat exchanger 7 and thence to cooler 8. Pipe 6 and/or exchanger 7 are also packed with coarse lumps of the catalytic material 5.

The cooler product is discharged from cooler 8 into a gas separation drum 9 from which the liquid product is withdrawn to storage (not shown) by line 10 and the gas is removed by line 11 to a suitable purification system indicated generally at 12. The purification system may comprise an oil scrubber for removing saturated quantities of hydrogen sulphide and hydrocarbon constituents. The purified gas is then recompressed by booster pump 13 and forced, preferably together with feed oil from pump 14, through exchanger 7 and thence to the inlet of coil 1. Fresh or make-up hydrogen is supplied by line 15 under pressure and a part of the gas may be passed directly into the reaction drum by means of line 16.

In the refining of illuminating oil and lubricating oils by means of high pressure hydrogen in the presence of suitable catalysts, temperatures in excess of 750° F. are ordinarily used and it has been found that there is considerable deterioration of the oil while cooling through the range from operating temperature down to about 600° F. This is shown by discoloration, or inability to hold color during storage for light oils as well as formation of gum in naphtha and particularly by deterioration of burning qualities in illuminating oils. In lubricating oil, tar or asphalt formation occurs and spoils both color and general lubricating qualities. It has been found however that all of these adverse effects may be avoided by cooling the oil through the critical temperature range down to 700° F. or preferably further, say to 600° F. in the presence of suitable catalytic material preferably the same as is used in the reaction drum. Metal oxides are preferred, such as chromium or molybdenum oxide or their mixtures with each other or other oxides, such as alkalies or alkaline earths or alumina, zinc oxides and the like. Catalytic materials of the type described are known as sulfactive catalyst.

The catalyst may be packed in lumps in the drum and condenser and also preferably in all hot lines at a temperature above 600° F. The catalyst may be compressed into lump form or may be spread on suitable inert material, such as fire brick and the like.

As noted above, the temperature required for my process is in excess of 750° F. and the pressure is in excess of about 20 atmospheres but preferably above 100 or even 200 atmospheres. With kerosene and lubricating oil the temperature is generally between about 750 and 870° F. but with naphthas or heavy oils for production of naphtha higher temperatures up to about 1100° F. are used. These high pressure hydrogenation processes for the production of naphtha, kerosene or lubricating oil are conducted at temperatures at which pyrolitic action is appreciable, especially in the production of naphthas from heavier oils, and hence are generally described as destructive hydrogenation processes.

The present invention is not to be limited by any theory of the mechanism of the process nor by any specific example of its operation which may be given merely for illustrative purposes. This invention is to be limited only by the following claims in which it is desired to claim all novelty inherent in the invention.

I claim:

1. In a process for the destructive hydrogenation of hydrocarbon oils under pressures in excess of twenty atmospheres, at temperatures in excess of 750° F. and in the presence of a sulfactive catalytic material, the improvement which comprises maintaining the products of reaction in contact with a packed mass of catalytic material which promotes hydrogenation during substantially the entire time until the temperature of the products is below that at which decomposition would occur in the absence of a hydrogenating catalytic material.

2. Process according to claim 1 in which the products of reaction are maintained in contact with the hydrogenating catalytic material until they have been cooled to a temperature of at least 600° F.

3. Process according to claim 1 in which the products of reaction are maintained in contact with a packed mass of the same type of sulfactive catalytic material as used in the destructive hydrogenation until cooled to below a temperature at which decomposition would occur in the absence of the sulfactive catalyst.

4. In a process for preparing low boiling hydrocarbons suitable for motor fuel by the destructive hydrogenation of heavy hydrocarbon oil under pressure in excess of twenty atmospheres, at a temperature above 750° F. and in the presence of a sulfactive catalyst, the improvement which comprises maintaining the products of reaction in contact with a packed mass of a hydrogenating catalytic material during substantially the entire time until the products have been cooled to below a temperature at which decomposition would occur in the absence of a hydrogenating catalytic material and then further cooling the products in the absence of a hydrogenating catalytic material.

5. In a process for the destructive hydrogenation of hydrocarbon oils under pressure in excess of 20 atmospheres, at temperature in excess of 750° F. and in the presence of a sulfactive catalytic material, the steps which comprise withdrawing products from the reaction zone at a temperature above 750° F., and passing these products through a cooling zone packed with a mass of sulfactive catalytic material which promotes hydrogenation and which extends until contiguous with the sulphactive catalytic material.

JAMES M. JENNINGS.